Patented Jan. 19, 1937

2,068,081

UNITED STATES PATENT OFFICE 2,068,081

ART OF COLORING FRUIT

Jagan N. Sharma, Riverside, Calif., assignor to Food Machinery Corporation, San Jose, Calif., a corporation of Delaware No Drawing. Application January 4, 1935, Serial No. 363

3 Claims. (Cl. 99—103)

This invention relates to improvements in the art of enhancing the varietal color of citrus fruit. The desirability of enhancing the varietal color of citrus fruit (and other fruit provided with water-repellent skins or peels) has been stated previously in the Harvey Patent No. 1,909,860 and need not be repeated. Certain difficulties have been encountered in coloring fruit commercially. The color-imparting agents, whether they be solutions, colloidal suspensions, emulsions or solids, must be of such character as to impart the desired coloration to the fruit without causing burning or withering.

Furthermore, a uniform color should be imparted to the fruit, that is, the fruit should not be spotted, nor should the normal or natural texture of the skin or peel of the fruit be masked or destroyed. The times and temperatures used during the coloring treatment must be brief and relatively low as high temperatures are detrimental to the fruit and long treating times necessarily increase the cost of the treatment. In view of the fact that fruit are often exposed to sunlight for appreciable periods of time before they are purchased by the ultimate consumer, the dyes used should be substantially sunfast.

The actual treatment of the fruit may be accomplished either by a liquid medium or a substantially solid medium. When liquid mediums are used, they may be either solutions or emulsions. A particularly effective manner of preparing the coloring agent or medium is described in my copending application Serial No. 712,831, filed February 24, 1934. As there pointed out, the process may comprise the formation of a colloidal solution or suspension of a water-insoluble dye in an aqueous medium, suitable surface tension reducing agents being added thereto in order to facilitate wetting of the water-repellent skins or peels of the fruit with the treating medium. A further method which may be used is one in which the dye compound is incorporated in a waxy carrier which may then be applied to the fruit by polishing, rubbing, and other well known methods of applying wax to fruit.

This invention is particularly directed to organic dye compounds which are oil soluble, substantially water-insoluble, and characterized by their ability to withstand the bleaching effect of sunlight. It is known that certain oil-soluble dyes when applied to fruit having water repellent skins, such as citrus fruit for example, are capable of adding color to the fruit. It has been found, however, that while oil-soluble dyes are required for the purpose, not all oil-soluble dyes are suitable, since some will not impart a desired coloration to fruit at all, and further, such of the oil-soluble dyes as have heretofore been known to the art to be effective for the purpose have not proven altogether satisfactory by reason of not being sunfast.

I have now discovered that if oil-soluble azo dye compounds are prepared to contain a free hydroxyl radical, (the presence of which can readily be ascertained by a simple test hereinabove disclosed) such dyes when applied to the fruit are not only capable of imparting added color thereto but are also sunfast.

More specifically, I have discovered that when dyes of the diazotized type (azo or diazo dyes) are made in such manner that a free hydroxyl radical is attached to a double ring component of the dye and the dye compound will dissolve in alkali solutions and exhibit a desired color in such alkali solutions, then the dye compound meeting such test is eminently suited for use in enhancing the varietal color of fruit and is sunfast. I have also discovered that while all dye compounds of this character may be satisfactorily used, if diazotized toluidine is coupled with a naphthol, a dye having the required characteristics to an extent surpassing any heretofore known dyes is obtained. Furthermore, the dyes of this invention are readily and very cheaply manufactured, thereby reducing the cost of coloring fruit very materially.

An object of this invention, therefore, is to disclose and provide dye compounds which are eminently suited for use in the art of enhancing the varietal color of fruit provided with waxy, oily or water-repellent skins or peels.

Another object of the invention is to provide a method of enhancing the varietal color of fruit having water-repellent surfaces by the use of dye compounds which are not only effective to enhance the color of the fruit but which are sunfast as well.

Another object of the invention is to disclose and provide methods whereby suitable oil-soluble dyes may be readily and economically manufactured.

A further object is to disclose and identify dye compounds characterized by their ability to be absorbed by water-repellent skins or peels of fruit in the presence of various other substances, such as soaps, waxes, oils, sterilizing agents, and the like.

These and other objects, uses, advantages, adaptations and modifications of my invention will become apparent from the following detailed description of dye compounds, their methods of manufacture, and methods of identification and utilization.

The preferred dye compounds are of the diazotized type and preferably include a double ring component coupled to a single ring component. Instead of the double ring component, any poly-ring component could be used. The coupling may be accomplished by a single double-bonded nitrogen group or by a number thereof. The location of the coupling bond is not material. The poly-ring component of the dye compound should, however, carry a free hydroxyl radical, the position of said radical being of minor importance. This free hydroxyl radical should be capable of reacting with alkalies so that the dye, when added to an aqueous solution of sodium hydroxide, potassium hydroxide or other alkali, will dissolve therein (the extent of solution varying somewhat with the concentration of the alkali).

Furthermore, the alkaline solution of the dye compound should exhibit a desired varietal shade of color of the fruit to be treated, although the color of such solution may not be the same as the color of the dye itself. It will be understood that the dye is not applied to the fruit in such alkaline solution, the making of which solution is merely a test to determine the presence of the desired hydroxyl radical and the color the dye will impart to the fruit when applied thereto. It may be explained that where the dye changes color under the alkali reaction test referred to, it will likewise do so when applied to the fruit, apparently due to its reaction with alkaline constituents in the skin of the fruit.

A summary of the characteristics of the suitable dyes, therefore, shows that the dye compound must be of the diazotized type including at least two ring components coupled together by a double nitrogen bond. The poly-ring component should be provided with a free hydroxyl radical in the alpha or beta position and capable of reacting with alkali solutions and developing a desired color in such solution. The dye compound should also be oil-soluble and substantially water-insoluble. Dyes answering these requirements will be found eminently suited for use in enhancing the varietal color of fruit and are sunfast.

A simple but most effective dye answering the above requirements may be formed from ortho-toluidine and beta-naphthol. In using these ingredients, 1 mol. of ortho-toluidine is mixed with 1 mol. of sodium nitrite and about 2½ mols of concentrated hydrochloric acid. The mixing is preferably carried out in the cold and the mixture kept cold, that is, at a temperature below about 10° C. and preferably at about 2° C. to 4° C. This diazotization results in a diazonium salt of orthotoluidine. From this point on, atmospheric temperatures may be employed and it is not necessary to refrigerate the reagents.

The diazotized toluidine is then neutralized with a solution of a strong base and a weak acid, such as sodium acetate, for the purpose of neutralizing the excess hydrochloric acid which was used during diazotization. The product of neutralization is then intimately mixed with 1 mol. of beta-naphthol dissolved in 1 mol. of sodium hydroxide. A relatively dilute sodium hydroxide solution, such as 5-7 normal, may be used. More dilute solutions simply increase the volume of liquid to be handled. The coupling reaction produces a salt (in this case the sodium salt) of ortho-toluene-azo-beta-naphthol. This salt is then neutralized with hydrochloric acid, the finished dye being precipitated in the form of an easily filterable product.

The dye obtained by the use of ortho-toluidine and beta-naphthol is a light shade of orange. When this dye is dissolved in an alkali solution, such as ½ normal or 1 normal solution of NaOH, it assumes a deep scarlet color, rendering it particularly useful in enhancing the varietal color of oranges. The dye obtained above contains a free OH radical and is very resistant to the bleaching effect of sunlight.

It is to be understood that meta and para-toluidine can also be used. Alpha-naphthol can be substituted for beta-naphthol, but when such substitutions are made the color of the resulting dye is changed. Also, instead of using toluidine, other compounds such, for example, as aniline, xylidine, and the like may be diazotized in the manner described and coupled with naphthol to produce dyes suitable for the purpose. It will be understood that para, meta, and ortho substitutions may be used.

In the specific example given hereinabove, sodium nitrite and hydrochloric acid were used for the purpose of diazotizing the toluidine. Nitrous acid is the active reagent in this step of the process but instead of using nitrous acid alone, it is preferably generated by the action of a mineral acid or a nitrite. Any mineral acid and nitrite may be used but the alkaline nitrites are preferred.

During the neutralization of the excess acid which is required during the diazotizing step, any salt of a strong base and a weak acid can be used. Sodium acetate, sodium carbonate and the alkaline salts are preferred as they do not subsequently form insoluble precipitates.

It is to be understood that the dyes of this invention may be brought into contact with the fruit which it is desired to treat, in any suitable manner. The dyes may be dissolved in an oil or other solvent and the solution then brought in contact with the fruit either directly or in the form of an emulsion. Preferably, however, the dyes of this invention are placed into colloidal suspension or solution in an aqueous medium and the fruit then contacted therewith. The use of surface tension reducing agents in the manner described in my copending application Serial No. 712,831 greatly facilitates the treatment and reduces the time of contact necessary. When a diazotized toluidine coupled with naphthol dye is used, not more than five minutes contact at a temperature of 100° F. is necessary to impart the desired color to the fruit. Furthermore, it is to be understood that the coloring agent, whether a solution, emulsion or suspension, may contain other ingredients such as waxes, oils, sterilizing or antiseptic agents, and the like.

Those skilled in the art of dye chemistry and in the treatment of fruit will appreciate that numerous changes and modifications may be made. All changes, modifications, adaptations and uses coming within the scope of the appended claims are embraced thereby.

I claim:

1. In a process of enhancing the varietal color of fruit provided with water-repellent surfaces, the step of bringing whole fruit in contact with an organic dye containing a diazotized ring component and a poly-ring component coupled therewith, said poly-ring component carrying a free hydroxyl radical whereby the dye is rendered soluble in aqueous alkali solutions; said dye being oil-soluble and substantially water-insoluble and exhibiting a color suitable for enhancing the varietal color of fruit when in solution in said aqueous alkali.

2. In a process of enhancing the varietal color of whole citrus fruit, the step of bringing whole citrus fruit in contact with a diazotized type, organic dye, said dye including a ring component coupled to a poly-ring component by double nitrogen bond, the poly-ring component being provided with a free hydroxyl radical capable of reacting with and developing a color suitable for enhancing the varietal color of citrus fruit when said dye is placed in solution in an aqueous alkali solution; said dye being oil-soluble, substantially water-insoluble and sunfast.

3. In a process of enhancing the varietal color of whole citrus fruit, the step of bringing whole citrus fruit in contact with a diazotized type organic dye, said dye including a ring component coupled to a poly-ring component by a double nitrogen bond, the poly-ring component being provided with a free hydroxyl radical capable of reacting with and developing a color suitable for enhancing the varietal color of citrus fruit when said dye is placed in solution in an aqueous alkali solution; said dye being oil-soluble, substantially water-insoluble and sunfast; said dye being produced by coupling diazotized orthotoluidine with naphthol.

JAGAN N. SHARMA.